US012641355B2

(12) United States Patent
Wang et al.

(10) Patent No.: US 12,641,355 B2
(45) Date of Patent: May 26, 2026

(54) TELEMETRY REPORTING BASED ON DEVICE POWER STATUS

(71) Applicant: Intel Corporation, Santa Clara, CA (US)

(72) Inventors: Junyuan Wang, Shanghai (CN); Timothy Waite, Chandler, AZ (US); Ziye Yang, Shanghai (CN); Zijuan Fan, Shanghai (CN); Yao Huo, Shanghai (CN); Weigang Li, Shanghai (CN); Yuze Xiao, Shanghai (CN); Greg Thomas, Annacotty (IE); Qianjun Xie, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/830,223

(22) Filed: Jun. 1, 2022

(65) Prior Publication Data

US 2022/0295160 A1 Sep. 15, 2022

(30) Foreign Application Priority Data

Apr. 21, 2022 (WO) ................ PCT/CN2022/088115

(51) Int. Cl.
*H04Q 9/00* (2006.01)
*G06F 21/72* (2013.01)

(52) U.S. Cl.
CPC .............. *H04Q 9/00* (2013.01); *G06F 21/72* (2013.01); *H04Q 2209/883* (2013.01)

(58) Field of Classification Search
CPC ........... H04Q 2209/00; H04Q 2209/30; H04Q 2209/40; H04Q 2209/80; H04Q 2209/82; H04Q 2209/84; H04Q 2209/88; H04Q 2209/883; H04Q 9/00; G06F 21/72
See application file for complete search history.

(56) References Cited

U.S. PATENT DOCUMENTS

| | | | | |
|---|---|---|---|---|
| 9,918,146 | B2 * | 3/2018 | Rana | ........................ H04L 67/10 |
| 11,480,625 | B2 * | 10/2022 | Hom | ........................ H02J 7/005 |
| 11,822,411 | B2 * | 11/2023 | Rajwan | ................. G06F 1/3278 |

OTHER PUBLICATIONS

Ariel, "What Is Link State Power Management & How to Turn It On or Off [Partition Manager]", https://www.partitionwizard.com/partitionmanager/link-state-power-management.html, Last Updated Nov. 8, 2021, 6 pages.
Kwa, Seh and Cohen, Debra T., "PCI Express Architecture Power Management", Intel White Paper, Rev. 1.1, Nov. 8, 2022, 15 pages.
Microsoft Q & A, "How can I turn off Telemetry?", https://learn.microsoft.com/en-us/answers/questions/459823/how-can-i-turn-off-telemetry, Jul. 1, 2021, 8 pages.
Wysocki, Rafael, J., "PCI Power Management", The Linux Kernel, https://docs.kernel.org/power/pci.html, Copyright © 2010, 20 pages.

* cited by examiner

*Primary Examiner* — Franklin D Balseca
(74) *Attorney, Agent, or Firm* — Compass IP Law PC

(57) ABSTRACT

Examples described herein relate to circuitry to provide telemetry data of first circuitry based on a power state of the first circuitry and provide telemetry data of second circuitry based on a power state of the second circuitry.

20 Claims, 6 Drawing Sheets

| Section 0 |
| :---: |
| Section 1 |
| Section ... |
| Telemetry events information section 202 |

| Set0(Event_0, E_1,...,E_N) |
| :---: |
| Set1(E_N+1,...,E_M) |

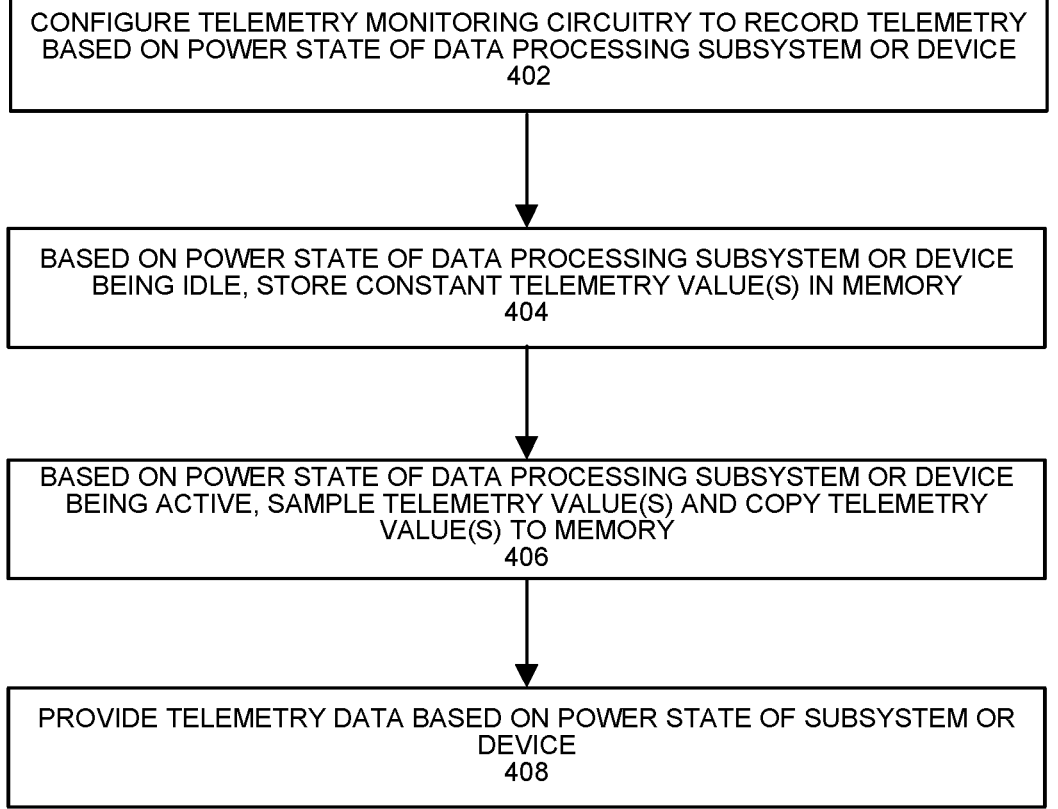

CONFIGURE TELEMETRY MONITORING CIRCUITRY TO RECORD TELEMETRY
BASED ON POWER STATE OF DATA PROCESSING SUBSYSTEM OR DEVICE
402

BASED ON POWER STATE OF DATA PROCESSING SUBSYSTEM OR DEVICE
BEING IDLE, STORE CONSTANT TELEMETRY VALUE(S) IN MEMORY
404

BASED ON POWER STATE OF DATA PROCESSING SUBSYSTEM OR DEVICE
BEING ACTIVE, SAMPLE TELEMETRY VALUE(S) AND COPY TELEMETRY
VALUE(S) TO MEMORY
406

PROVIDE TELEMETRY DATA BASED ON POWER STATE OF SUBSYSTEM OR
DEVICE
408

FIG. 4

TELEMETRY REPORTING BASED ON DEVICE POWER STATUS

RELATED APPLICATION

This application claims the benefit of priority to Patent Cooperation Treaty (PCT) Application No. PCT/CN2022/088115 filed Apr. 21, 2022. The entire content of that application is incorporated by reference.

BACKGROUND

In heterogeneous computation systems such as datacenters, device telemetry is monitored and collected to indicate device runtime status such service capabilities, bandwidth, latency, and other operational data. Device telemetry is reported to an orchestrator and the orchestrator manages execution of services by devices based on device telemetry. During a telemetry sampling cycle, the device utilizes computing cycles arising from memory reading, writing, and information calculation to determine device telemetry. When a device is in an idle power state, the device is not performing data processing and device telemetry events can be constant values, but can cost device computing effort. A potential attack surface arises to device power management (PM) if telemetry requests wake-up the device from power idle state. The device may not be permitted to enter a reduced power consumption state in order to provide device telemetry.

BRIEF DESCRIPTION OF THE DRAWINGS

FIG. 4 depicts an example process.

DETAILED DESCRIPTION

Intel® QuickAssist Technology (QAT) can enter into power idle state when no workload is present and device computing units are idle. In power idle state, device clock gating can be triggered, which decreases device clock frequency and the device's required power budget is decreased. The device telemetry values can be constant values as there is no change. For example, host interface (HI) related telemetry such as utilized Peripheral Component Interconnect Express (PCIe) upstream or downstream bandwidth are zero, address translation-related events such as translation lookaside buffer (TLB) (e.g., Linux® DevTLB) miss count and hit count are zero, data processing slices utilization and execution cycle are zero, and so forth. If QAT receives a device telemetry request, QAT-executed firmware can invoke execution of instruction sets to read device telemetry Control and Status Register (CSRs) and calculate information for the telemetry events but power consumption of QAT is not reduced.

To potentially allow a device to reduce power consumption and provide device telemetry data, a device can be partitioned into multiple subsystems and provide a stored value of telemetry for a subsystem that is in a reduced power consumption state (e.g., sleep state, power gated, or clock gated state) or provide a sampled value of telemetry for a subsystem that is in a power state such that the frequency of operation and available power are not gated (e.g., reduced). For example, device telemetry data can be stored in a memory device in at least two sets, where a first set can include constant value device telemetry data for a subsystem that is in a power idle state and a second set can include sampled telemetry data for a subsystem that is in an active state.

For example, if a subsystem is in a reduced power consumption state or a telemetry sampling interval level for the subsystem is less than a threshold level, the device can provide a prior sampled value of telemetry for the subsystem as that sampled in a prior round of telemetry measurement and calculation or reject the request for telemetry data. The device can utilize a telemetry handler that is implemented in device firmware to provide requested telemetry data for a subsystem based on subsystem power state.

Figure 1:
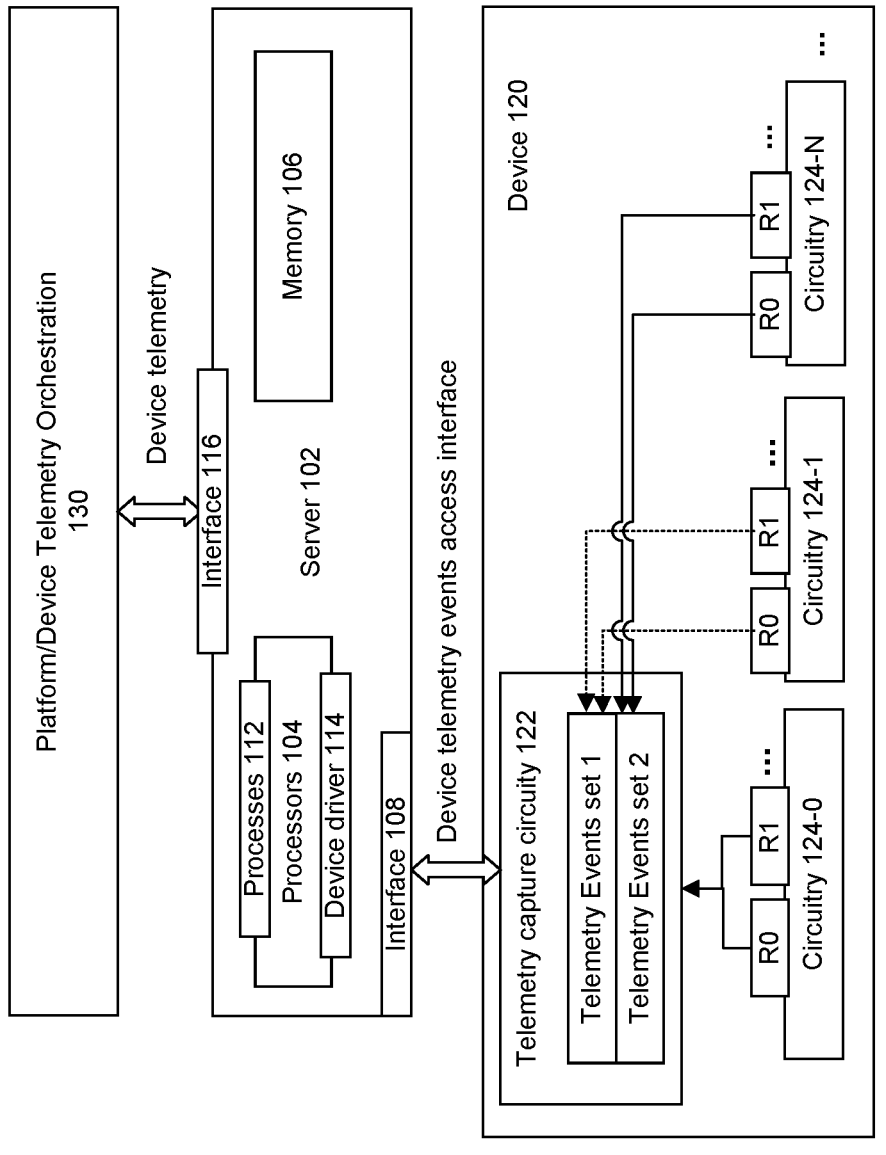
FIG. 1 depicts an example system.

FIG. 1 depicts an example system. Server 102 can include or access one or more processors 104, one or more memory 106, interface 108, interface 116, among other components described herein (e.g., accelerator devices, interconnects, and other circuitry). Processors 104 can execute one or more processes 114 (e.g., microservices, virtual machines (VMs), microVMs, containers, or other distributed or virtualized execution environment). Various examples of processors 104 are described herein. In some examples, disaggregated or composite servers formed from hardware and software of multiple servers can execute multi-tenant environments such as VMs, microVMs, containers, applications, or processes. Server 102 can represent a disaggregated or composite servers that performs workloads from one tenant or different tenants and is composed by devices and software on different platforms connected via an interconnect, fabric, or network.

Interface 108 and/or interface 116 can communicate based on Peripheral Component Interconnect Express (PCIe), Compute Express Link (CXL), Universal Chiplet Interconnect Express (UCIe), or other connection technologies. See, for example, Peripheral Component Interconnect Express (PCIe) Base Specification 1.0 (2002), as well as earlier versions, later versions, and variations thereof. See, for example, Compute Express Link (CXL) Specification revision 2.0, version 0.7 (2019), as well as earlier versions, later versions, and variations thereof. See, for example, UCIe 1.0 Specification (2022), as well as earlier versions, later versions, and variations thereof. In some examples, interface 108 and/or interface 116 can include network interface device circuitry. A network interface device can be implemented as one or more of: a network interface controller (NIC), a remote direct memory access (RDMA)-enabled NIC, SmartNIC, router, switch, forwarding element, infrastructure processing unit (IPU), or data processing unit (DPU). Communications between server 102 and device 120 can utilize direct memory access (DMA) or memory-mapped I/O (MMIO) technologies.

OS 110 or driver 112 can enable or disable utilization of telemetry capture technologies in device 120. OS 110 can include or utilize driver 112 to manage telemetry capture circuitry 122, described herein. Device driver 112 can be implemented in host kernel space in some examples.

Device 120 can include one or more of: network interface device, accelerator, storage device, memory device (e.g., memory pool with dual inline memory modules (DIMMs)), graphics processing unit, cryptographic offload circuitry, workload queue manager, audio or sound processing device, and so forth. Device 120 can include or utilize telemetry capture circuitry 122 to copy operating state information of one or more of circuitry 124-0 to 124-N, where N is 2 or more. In some examples, telemetry capture circuitry 122 can be implemented as firmware, application specific integrated circuit (ASIC), field programmable gate array (FPGA), or other circuitry.

For example, circuitry 124-0 to 124-N can include data processing units (e.g., public key encryption (PKE), symmetric key encryption or decryption, hash calculation, compression, decompression, and so forth). Power usage and/or frequency of operation of circuitry 124-0 to 124-N can be independent from one another. For example, when circuitry 124-0 performs processing compression service and are power active but circuitry 124-1 performs cryptographic operations but is power idle, telemetry capture circuitry 122 can provide sampled telemetry data of circuitry 124-0 but provide a measured telemetry data of 124-1 measured once (or at a reduced frequency) after circuitry 124-0 entered lower power state.

Telemetry capture circuitry 122 can include or utilize memory to store at least two sets of telemetry event data. A first set of telemetry event data can include event data which are constant values (no change) and are for circuitry of circuitry 124-0 to 124-N that are in an idle or power gated state. For example, idle or power gated state can include approximately zero power consumption. For example, clock gating can include utilization of a reduced operating clock frequency, e.g., 10-30% of full frequency. Power or frequency gated states can include PCIe specification defined device power states D1, D2, or D3. A second set of telemetry event data can include event data which are values determined during a telemetry sampling cycle and telemetry can be copied from registers to memory, at sample cycles.

For example, after circuitry among circuitry 124-0 to 124-N enters idle state, telemetry capture circuitry 122 can copy telemetry from a register of an idle circuitry among circuitry 124-0 to 124-N from registers (e.g., R0, R1, and so forth) to the first set of telemetry data in memory. For example, telemetry capture circuitry 122 can copy sampled telemetry from a register of an active circuitry among circuitry 124-0 to 124-N from registers (e.g., R0, R1, and so forth) to the second set of telemetry data in memory.

In response to a request for telemetry (e.g., from orchestrator 130 or driver 114), telemetry capture circuitry 122 can respond to the requests based on power state of the circuitry 124-0 to 124-N. If a circuitry among circuitry 124-0 to 124-N is in a power idle state and a request for corresponding telemetry data is received, telemetry capture circuitry 122 can provide the first set of telemetry events to the requester via interface 108 and potentially interface 116. If a circuitry among circuitry 124-0 to 124-N is in a power active state and a request for corresponding telemetry data is received, telemetry capture circuitry 122 can provide the second set of telemetry events via interface 108 and potentially interface 116.

In some examples, telemetry capture circuitry 122 can limit a number of telemetry event data requests over an interval of time or rate of telemetry event data requests from a particular circuitry among circuitry 124-0 to 124-N. For example, telemetry capture circuitry 122 can limit a number of telemetry event data requests from a particular circuitry among circuitry 124-0 to 124-N over an interval of time or rate of telemetry event data requests from a particular requester. Accordingly, telemetry capture circuitry 122 can potentially rate-limiting request for telemetry data.

Examples of telemetry data of one or more of circuitry 124-0 to 124-N can include one or more of: TLB hit/miss rate per Virtual Function (VF) or Physical Function (PF), PCIe read/write bandwidth per VF/PF, read latency, read latency accumulation, service slice utilization (e.g., cipher utilization level, compression utilization level, Public Key Encryption (PKE) utilization), power consumption, power state, power transitions, cache misses, memory bandwidth utilization, memory size usage, memory allocation, core clock frequency speed, core clock cycle utilization, networking bandwidth used, core idle measurement, core execution of user space processes, core waiting for an input/output operation to complete, cache allocation/utilization, network interface bandwidth (transmit or receive) utilization, CPU cycle utilization, GPU cycle utilization, database transactions/second, Collectd telemetry, performance monitoring unit (PMU) counters, performance monitoring counters (PMON), performance counter monitor (see, e.g., Willhalm, "Intel® Performance Counter Monitor—A Better Way to Measure CPU Utilization" (2017)), and so forth.

In some examples, telemetry data can be transmitted in metadata of in-band telemetry schemes to telemetry orchestration system 130 such as those described in: "In-band Network Telemetry (INT) Dataplane Specification, v2.0," P4.org Applications Working Group (February 2020); IETF draft-lapukhov-dataplane-probe-01, "Data-plane probe for in-band telemetry collection" (2016); or IETF draft-ietf-ippm-ioam-data-09, "In-situ Operations, Administration, and Maintenance (IOAM)" (Mar. 8, 2020). In-situ Operations, Administration, and Maintenance (IOAM) records operational and telemetry information in the packet while the packet traverses a path between two points in the network. IOAM discusses the data fields and associated data types for in-situ OAM. In-situ OAM data fields can be encapsulated into a variety of protocols such as NSH, Segment Routing, Geneve, IPv6 (via extension header), or IPv4.

Orchestration system 130 or monitoring and analytics system can request telemetry data from server 102 for one or more of circuitry 124-0 to 124-N of device 120. An example of orchestration system 130 can include a system that allocates execution of processes (e.g., workloads) on devices and platforms such as Google's Borg cluster manager, Kubernetes, Edge Multi-Cluster Orchestration (EMCO), and so forth. An example of monitoring and analytics system includes collectD. Orchestration system 130 can request telemetry data for device 120 or its subsystem (e.g., one or more of circuitry 124-0 to 124-N).

While the example depicts a single device 120, telemetry data from multiple devices 120 can be captured and made available to a requester in a similar manner as that described with respect to device 120.

Figure 2:
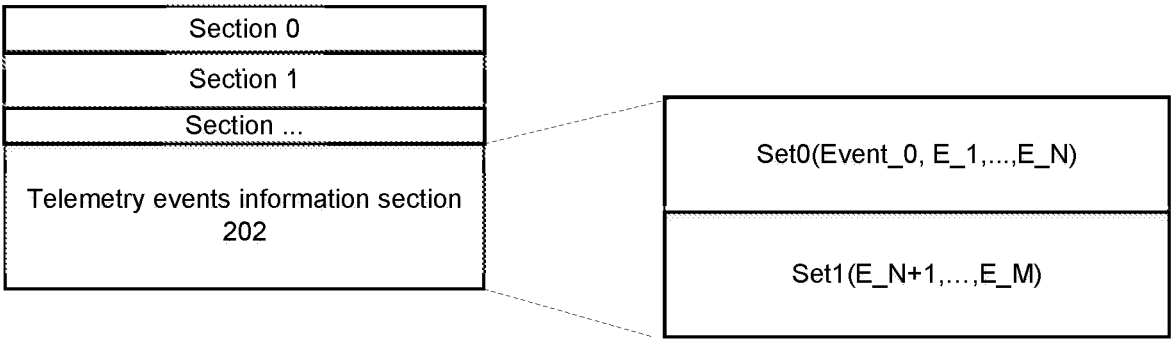
FIG. 2 depicts an example manner to allocate sections of memory to store device telemetry data.

FIG. 2 depicts an example manner to allocate sections of memory to store device telemetry data. Multiple sections can be allocated in a memory device, where a section includes set0 that can store telemetry data for one or more subsystems in an idle state and set 1 that can store telemetry data for one or more subsystems in an active state. For example, telemetry events information section 202 can be stored in a memory of a device or a server. In some examples, the memory can be memory 106 or a memory in device 120. In some examples, telemetry events information section 202 can include a set0 and set1 of telemetry event data. For example, set0 can correspond to a first set of telemetry data for a subsystem in an idle state. For example, set1 can correspond to a second set of telemetry data for a subsystem in an active state.

For example, if subsystem0 is idle but subsystem1 is active, Section0 can store telemetry for subsystem0 such as subsystem0's utilization level, subsystem0's accumulated requests count, subsystem0's execution cycle, subsystem0's accumulated active time, etc. Section1 can store subsystem1's telemetry information. If subsystem1 changes power state from idle to active, then its telemetry location can be changed from Section0 to Section1 accordingly. Likewise, if subsystem1 changes power state from idle to active, then its telemetry location can be changed from Section0 to Section 1 correspondingly. Global telemetry events shared by subsystems (e.g., PCIe bandwidth input/output rates (per PF or per VF), DevTLB miss/hit rate, and others) can be stored in section0 if subsystems are idle or stored in section1 if subsystems are active.

Figure 3:
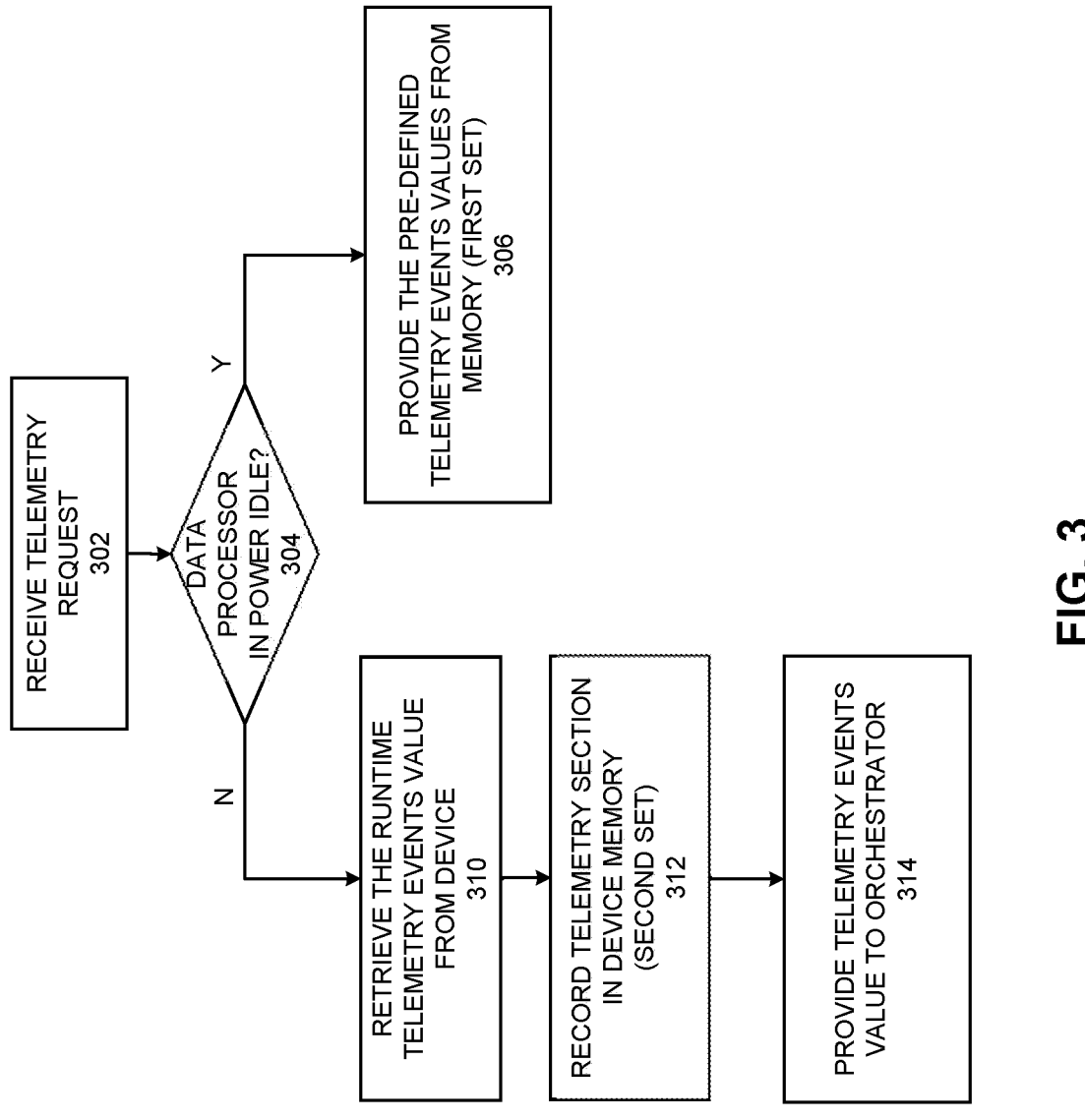
FIG. 3 depicts an example process.

FIG. 3 depicts an example process to respond to device telemetry requests according to power state of a device subsystem. The process can be performed by a device with a telemetry manager such as telemetry capture circuitry or firmware. At 302, a telemetry request can be received from a requester. A requester can include an orchestration system, telemetry capture system, driver, and/or operating system. At 304, a determination can be made if the request is directed to a data processing subsystem that is in a power idle state. If the request is directed to a data processing subsystem that is in a power idle state, the process can proceed to 306. If the request is not directed to a data processing subsystem that is in a power idle state, the process can proceed to 310.

At 306, telemetry event values for the requested telemetry data can be provided from a first set of telemetry data stored in memory. The first set of telemetry data stored in memory can be copied from registers of the data processing subsystem that is in a power idle state after the data processing subsystem enters power idle state. In some examples, the first set of telemetry data can include values corresponding to bandwidth utilization, address translation-related miss counts and hit count, and data processing slices utilization and execution cycles. In some examples, the first set of telemetry data can be sampled one time or periodically, but at a reduced frequency, after the data subsystem enters idle or low power state. In some examples, values corresponding to bandwidth utilization, address translation-related miss count and hit count, and data processing slices utilization and execution cycles can be set to zero in memory without copying of telemetry data from registers of the data processing subsystem to memory. The telemetry data copied from the memory can be provided to the requester.

At 310, requested telemetry event values can be read from one or more registers associated with the data processing subsystem. A rate of sampling of telemetry data of a data subsystem in an active state can be higher than a rate of sampling of telemetry data of a data subsystem in an idle or low power state. At 312, the read telemetry event values can be stored to memory in a second set of data corresponding to active subsystems. At 314, the requested telemetry event values can be provided to the requester from the memory.

FIG. 4 depicts an example process. The process can be performed by an operating system, driver, and/or telemetry monitoring circuitry. At 402, an operating system or driver can enable a telemetry monitoring circuitry in a device to record telemetry data based on a power state of a subsystem of a device. In some examples, operating system or driver can enable a telemetry monitoring circuitry in a device to record telemetry data based on a power state of a device. At 404, based on the subsystem or device being in an idle state, telemetry of the subsystem or device can be sampled after entering idle state or set to zero values and stored in a memory as constant values. Telemetry of the subsystem or device can be sampled after entering idle state can be sampled one time, in some examples. Updates of the telemetry data may not take place while the subsystem or device is in an idle state. At 406, based on the subsystem or device being in an active state, telemetry of the subsystem or device can be sampled from registers of the subsystem or device and stored in a memory. At 408, based on a received request for telemetry data of the subsystem or device, the telemetry data can be read from a portion of the memory based on whether the subsystem or device is in idle or active state. For example, a portion of the memory can be allocated to store telemetry data of at least one subsystem or device in an idle state and a second portion of the memory can be allocated to store telemetry data of at least one subsystem or device in an active state.

Device telemetry can be utilized by an orchestrator to allocate resources to perform workloads according to applicable service level agreement (SLA) parameters.

Figure 5:
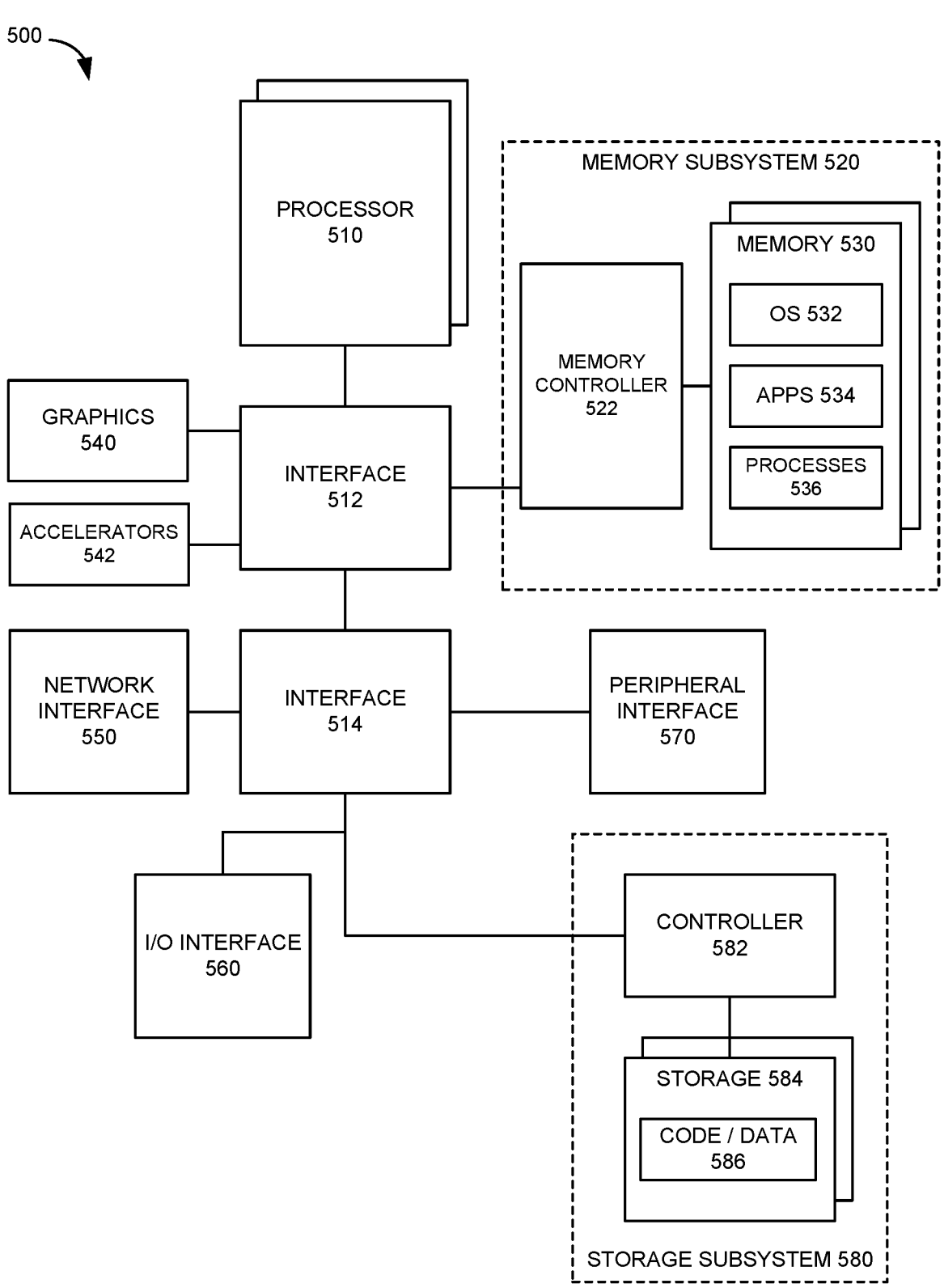
FIG. 5 depicts an example system.

FIG. 5 depicts an example computing system. Components of system 500 (e.g., processor 510, memory controller 522, graphics 540, accelerators 542, network interface 550, controller 582, and so forth) can be configured to access telemetry data for a component or its subsystem based on power usage state of the component or its subsystem, as described herein. System 500 includes processor 510, which provides processing, operation management, and execution of instructions for system 500. Processor 510 can include any type of microprocessor, central processing unit (CPU), graphics processing unit (GPU), processing core, or other processing hardware to provide processing for system 500, or a combination of processors. Processor 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 500 includes interface 512 coupled to processor 510, which can represent a higher speed interface or a high throughput interface for system components that needs higher bandwidth connections, such as memory subsystem 520 or graphics interface components 540, or accelerators 542. Interface 512 represents an interface circuit, which can be a standalone component or integrated onto a processor die. Where present, graphics interface 540 interfaces to graphics components for providing a visual display to a user of system 500. In one example, graphics interface 540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 540 generates a display based on data stored in memory 530 or based on operations executed by processor 510 or both. In one example, graphics interface 540 generates a display based on data stored in memory 530 or based on operations executed by processor 510 or both.

Accelerators 542 can be a fixed function or programmable offload engine that can be accessed or used by a processor 510. For example, an accelerator among accelerators 542 can provide compression (DC) capability, cryptography services such as public key encryption (PKE), cipher, hash/authentication capabilities, decryption, or other capabilities or services. In some embodiments, in addition or alternatively, an accelerator among accelerators 542 provides field select controller capabilities as described herein. In some cases, accelerators 542 can be integrated into a CPU socket (e.g., a connector to a motherboard or circuit board that includes a CPU and provides an electrical interface with the CPU). For example, accelerators 542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 542 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 520 represents the main memory of system 500 and provides storage for code to be executed by processor 510, or data values to be used in executing a routine. Memory subsystem 520 can include one or more memory devices 530 such as read-only memory (ROM), flash memory, one or more varieties of random access memory (RAM) such as DRAM, or other memory devices, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for system 500. In one example, memory subsystem 520 includes memory controller 522, which is a memory controller to generate and issue commands to memory 530. It will be understood that memory controller 522 could be a physical part of processor 510 or a physical part of interface 512. For example, memory controller 522 can be an integrated memory controller, integrated onto a circuit with processor 510.

In some examples, OS 532 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, Broadcom®, Nvidia®, IBM®, Texas Instruments®, among others. In some examples, a driver can be configured to negotiate with a device to access telemetry data for a data processing subsystem based on power usage state of the data processing subsystem, as described herein.

While not specifically illustrated, it will be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 500 includes interface 514, which can be coupled to interface 512. In one example, interface 514 represents an interface circuit, which can include standalone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can transmit data to a device that is in the same data center or rack or a remote device, which can include sending data stored in memory. Network interface 550 (e.g., packet processing device) can execute a virtual switch to provide virtual machine-to-virtual machine communications for virtual machines (or other virtual environments) in a same server or among different servers.

Some examples of network interface 550 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 500 includes one or more input/ output (I/O) interface(s) 560. I/O interface 560 can include one or more interface components through which a user interacts with system 500 (e.g., audio, alphanumeric, tactile/ touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage 584 holds code or instructions and data 586 in a persistent state (e.g., the value is retained despite interruption of power to system 500). Storage 584 can be generically considered to be a "memory," although memory 530 is typically the executing or operating memory to provide instructions to processor 510. Whereas storage 584 is nonvolatile, memory 530 can include volatile memory (e.g., the value or state of the data is indeterminate if power is interrupted to system 500). In one example, storage subsystem 580 includes controller 582 to interface with storage 584. In one example controller 582 is a physical part of interface 514 or processor 510 or can include circuits or logic in both processor 510 and interface 514.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM).

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, or NVM devices that use chalcogenide phase change material (for example, chalcogenide glass).

A power source (not depicted) provides power to the components of system 500. More specifically, power source typically interfaces to one or multiple power supplies in system 500 to provide power to the components of system 500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 500 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Communications between devices can take place using a network that provides die-to-die communications; chip-to-chip communications; circuit board-to-circuit board communications; and/or package-to-package communications.

Figure 6:
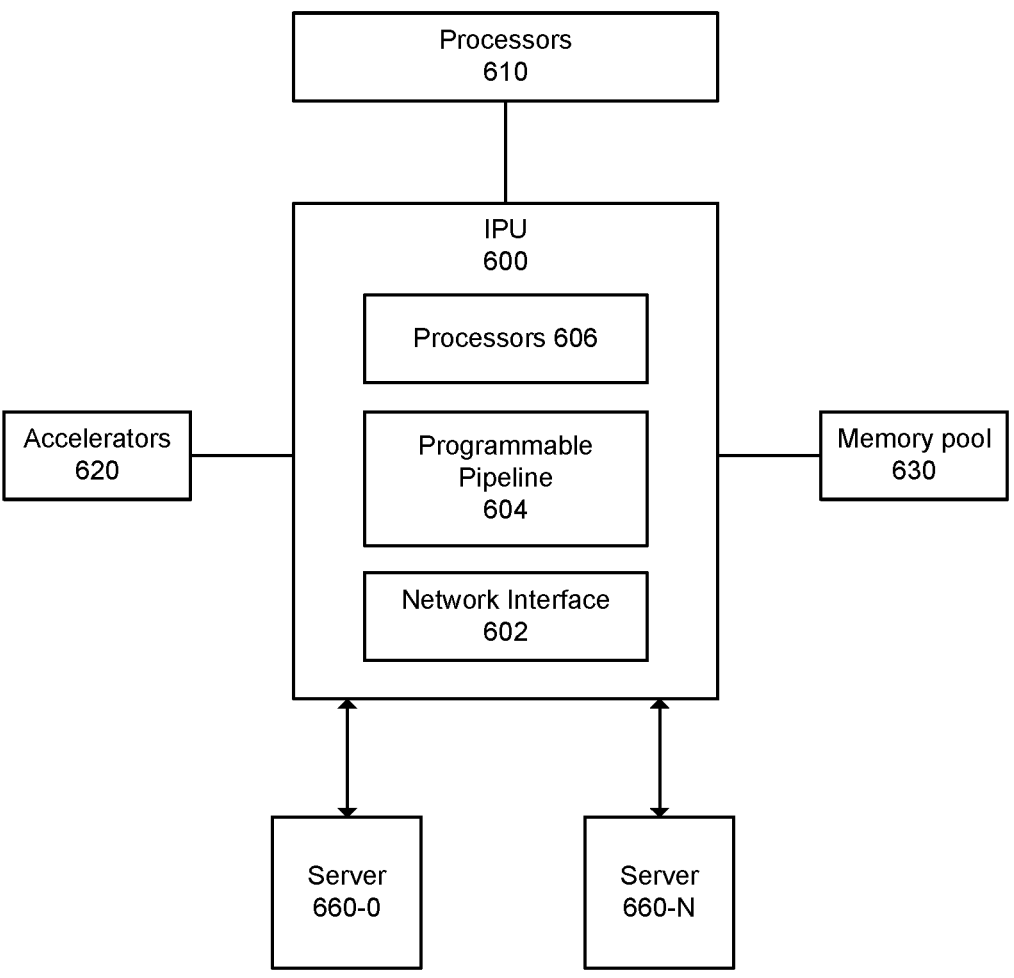
FIG. 6 depicts an example system.

FIG. 6 depicts an example system. In this system, IPU 600 manages performance of one or more processes using one or more of processors 606, processors 610, accelerators 620, memory pool 630, or servers 640-0 to 640-N, where N is an integer of 1 or more. In some examples, processors 606 of IPU 600 can execute one or more processes, applications, VMs, containers, microservices, and so forth that request performance of workloads by one or more of: processors 610, accelerators 620, memory pool 630, and/or servers 640-0 to 640-N. IPU 600 can utilize network interface 602 or one or more device interfaces to communicate with processors 610, accelerators 620, memory pool 630, and/or servers 640-0 to 640-N. IPU 600 can utilize programmable pipeline 604 to process packets that are to be transmitted from network interface 602 or packets received from network interface 602. Programmable pipeline 604 and/or processors 606 can be configured to access telemetry data for a data processing subsystem among multiple data processing subsystems based on power usage state of the data processing subsystem, as described herein.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes one or more examples and includes an apparatus comprising: an interface and circuitry to provide telemetry data of first circuitry based on a power state of the first circuitry and provide telemetry data of second circuitry based on a power state of the second circuitry.

Example 2 includes one or more examples, wherein the telemetry data of the first circuitry comprises constant values based on the power state of the first circuitry comprising idle and the telemetry data of the second circuitry comprises constant values based on the power state of the second circuitry comprising idle.

Example 3 includes one or more examples, wherein the constant values of the telemetry data of the first circuitry are sampled one time after the power state of the first circuitry becomes idle and the constant values of the telemetry data of the second circuitry are sampled one time after the power state of the second circuitry becomes idle.

Example 4 includes one or more examples, wherein the circuitry is to permit the first circuitry to remain in an idle state and provide telemetry data for the first circuitry based on the first circuitry being in an idle state and the circuitry is to permit the second circuitry to remain in an idle state and provide telemetry data for the second circuitry based on the second circuitry being in an idle state.

Example 5 includes one or more examples, wherein power states of the first circuitry and the second circuitry are independent.

Example 6 includes one or more examples, wherein the circuitry comprises firmware.

Example 7 includes one or more examples, and includes a device communicatively coupled to the interface, the device comprising: the first circuitry to perform a first operation and the second circuitry to perform a second operation.

Example 8 includes one or more examples, wherein the first operation comprises one or more of: public key encryption (PKE), symmetric key encryption or decryption, hash calculation, compression, or decompression and the second operation comprises one or more of: PKE, symmetric key encryption or decryption, hash calculation, compression, or decompression.

Example 9 includes one or more examples, wherein the device comprises one or more of: network interface device, accelerator, storage device, memory device, graphics processing unit, cryptographic offload circuitry, workload queue manager, or audio or sound processing device.

Example 10 includes one or more examples, and includes at least one non-transitory computer-readable medium comprising instructions stored thereon, that if executed by one or more processors, cause the one or more processors to: configure circuitry of a device to provide telemetry data of first circuitry of the device based on a power state of the first circuitry and provide telemetry data of second circuitry of the device based on a power state of the second circuitry.

Example 11 includes one or more examples, wherein the telemetry data of the first circuitry comprises constant values based on the power state of the first circuitry comprising idle and the telemetry data of the second circuitry comprises constant values based on the power state of the second circuitry comprising idle.

Example 12 includes one or more examples, wherein the constant values of the telemetry data of the first circuitry are sampled one time after the power state of the first circuitry becomes idle and the constant values of the telemetry data of the second circuitry are sampled one time after the power state of the second circuitry becomes idle.

Example 13 includes one or more examples, wherein the circuitry is to permit the first circuitry to remain in an idle state and provide telemetry data for the first circuitry based on the first circuitry being in an idle state and the circuitry is to permit the second circuitry to remain in an idle state and provide telemetry data for the second circuitry based on the second circuitry being in an idle state.

Example 14 includes one or more examples, wherein power states of the first circuitry and the second circuitry are independent.

Example 15 includes one or more examples, wherein the device comprises one or more of: network interface device, accelerator, storage device, memory device, graphics processing unit, cryptographic offload circuitry, workload queue manager, or audio or sound processing device.

Example 16 includes one or more examples, wherein operations of the first circuitry comprise one or more of: public key encryption (PKE), symmetric key encryption or decryption, hash calculation, compression, or decompression and operations of the second circuitry comprise one or more of: PKE, symmetric key encryption or decryption, hash calculation, compression, or decompression.

Example 17 includes one or more examples, and includes a method comprising: configuring circuitry of a device to provide telemetry data of first circuitry of the device based on a power state of the first circuitry and provide telemetry data of second circuitry of the device based on a power state of the second circuitry.

Example 18 includes one or more examples, wherein the telemetry data of the first circuitry comprises constant values based on the power state of the first circuitry comprising idle and the telemetry data of the second circuitry comprises constant values based on the power state of the second circuitry comprising idle.

Example 19 includes one or more examples, wherein the constant values of the telemetry data of the first circuitry are sampled one time after the power state of the first circuitry becomes idle and the constant values of the telemetry data of the second circuitry are sampled one time after the power state of the second circuitry becomes idle.

Example 20 includes one or more examples, and includes configuring the circuitry to permit the first circuitry to remain in an idle state and provide telemetry data for the first circuitry based on the first circuitry being in an idle state and permitting the second circuitry to remain in an idle state and provide telemetry data for the second circuitry based on the second circuitry being in an idle state.

What is claimed is:

1. An apparatus comprising:
an interface and
first circuitry, coupled to the interface, the first circuitry to provide telemetry data of second circuitry based on a power state of the second circuitry and provide telemetry data of third circuitry based on a power state of the third circuitry, wherein:
    based on the power state of the second circuitry being active, the telemetry data of the second circuitry comprises sampled values of the second circuitry and
    based on the power state of the second circuitry being idle, the telemetry data of the second circuitry comprises values stored in a memory device, the stored values taken on the second circuitry when the second circuitry was active and before the power state of the second circuitry became idle.

2. The apparatus of claim 1, wherein
the telemetry data of the third circuitry comprises values captured before the power state of the third circuitry became idle.

3. The apparatus of claim 2, wherein
the stored values of the telemetry data of the second circuitry are sampled one time after the power state of the second circuitry became idle and
the stored values of the telemetry data of the third circuitry are sampled one time after the power state of the third circuitry became idle.

4. The apparatus of claim 1, wherein the first circuitry is to permit the second circuitry to remain in an idle state and provide telemetry data for the second circuitry based on the second circuitry being in an idle state and the first circuitry is to permit the third circuitry to remain in an idle state and provide telemetry data for the third circuitry based on the third circuitry being in an idle state.

5. The apparatus of claim 1, wherein power states of the second circuitry and the third circuitry are independent.

6. The apparatus of claim 1, wherein the first circuitry comprises firmware.

7. The apparatus of claim 1, comprising:

a device communicatively coupled to the interface, the device comprising:

the second circuitry to perform a first operation and the third circuitry to perform a second operation.

8. The apparatus of claim 7, wherein the first operation comprises one or more of: public key encryption (PKE), symmetric key encryption or decryption, hash calculation, compression, or decompression and the second operation comprises one or more of: PKE, symmetric key encryption or decryption, hash calculation, compression, or decompression.

9. The apparatus of claim 7, wherein the device comprises one or more of:

network interface device, accelerator, storage device, memory device, graphics processing unit, cryptographic offload circuity, workload queue manager, or audio or sound processing device.

10. At least one non-transitory computer-readable medium comprising instructions stored thereon, that if executed by one or more processors, cause the one or more processors to:

configure first circuitry of a device to provide telemetry data of second circuitry of the device based on a power state of the second circuitry and provide telemetry data of third circuitry of the device based on a power state of the third circuitry, wherein:

based on the power state of the second circuitry being active, the telemetry data of the second circuitry comprises sampled values of the second circuitry and based on the power state of the second circuitry being idle, the telemetry data of the second circuitry comprises values stored in a memory device, the stored values were taken on the second circuitry when the second circuitry was active and before the power state of the second circuitry became idle.

11. The at least one computer-readable medium of claim 10, wherein the telemetry data of the third circuitry comprises values based on the power state of the third circuitry being idle.

12. The at least one computer-readable medium of claim 11, wherein the stored values of the telemetry data of the second circuitry are sampled one time after the power state of the second circuitry became idle and the stored values of the telemetry data of the third circuitry are sampled one time after the power state of the third circuitry became idle.

13. The at least one computer-readable medium of claim 10, wherein the first circuitry is to permit the second circuitry to remain in an idle state and provide telemetry data for the second circuitry based on the second circuitry being in an idle state and the first circuitry is to permit the third circuitry to remain in an idle state and provide telemetry data for the third circuitry based on the third circuitry being in an idle state.

14. The at least one computer-readable medium of claim 10, wherein power states of the second circuitry and the third circuitry are independent.

15. The at least one computer-readable medium of claim 10, wherein the device comprises one or more of: network interface device, accelerator, storage device, memory device, graphics processing unit, cryptographic offload circuity, workload queue manager, or audio or sound processing device.

16. The at least one computer-readable medium of claim 10, wherein operations of the second circuitry comprise one or more of: public key encryption (PKE), symmetric key encryption or decryption, hash calculation, compression, or decompression and operations of the third circuitry comprise one or more of: PKE, symmetric key encryption or decryption, hash calculation, compression, or decompression.

17. A method comprising:

configuring first circuitry of a device to provide telemetry data of second circuitry of the device based on a power state of the second circuitry and provide telemetry data of third circuitry of the device based on a power state of the third circuitry, wherein:

based on the power state of the second circuitry being active, the telemetry data of the second circuitry comprises sampled values of the second circuitry and based on the power state of the second circuitry being idle, the telemetry data of the second circuitry comprises values stored in a memory device, the stored values were taken on the second circuitry when the second circuitry was active and before the power state of the second circuitry became idle.

18. The method of claim 17, wherein the telemetry data of the third circuitry comprises values based on the power state of the third circuitry becoming idle.

19. The method of claim 18, wherein the stored values of the telemetry data of the second circuitry are sampled one time after the power state of the second circuitry became idle and the stored values of the telemetry data of the third circuitry are sampled one time after the power state of the third circuitry became idle.

20. The method of claim 17, comprising:

configuring the first circuitry to permit the second circuitry to remain in an idle state and provide telemetry data for the second circuitry based on the second circuitry being in an idle state and permit the third circuitry to remain in an idle state and provide telemetry data for the third circuitry based on the third circuitry being in an idle state.

* * * * *